3,035,339
METHOD OF SOLDERING AND FLUX THEREFOR
Robert C. Matter and Ira T. Landon, Anderson, Ind., assignors to General Motors Corporation, Detroit, Mich., a corporation of Delaware
No Drawing. Filed Aug. 12, 1957, Ser. No. 677,795
13 Claims. (Cl. 29—495)

This invention relates to soldering fluxes and methods of soldering and particularly to flux compositions especially suitable for soft soldering.

The majority of soldering fluxes heretofore known, while suitably fluxing the surfaces to be joined whereby at least portions of the surfaces are cleaned and prepared for the soldering operation, leave a residue between the parts to be joined wherein an imperfect joint is formed. These points of noncontinuity reduce the electrical conductivity of the joined parts and also reduce the strength of the joint in direct proportion to the quantity of extraneous material present.

Hydrazine fluxes such as one or more of the hydrazine hydrohalides have been used quite successfully as a means for joining metal parts. The hydrazine fluxes in water solution decompose upon attaining soldering temperatures and clean and flux the surfaces to be joined to provide highly desirable soldered joints. Water solutions of hydrazine fluxes, however, are difficult to maintain in place and likewise tend to boil and splatter when the heat is applied adjacent the flux which causes nonuniformity of fluxing action and, in some cases, disrupts the continuous joints. Other means heretofore proposed to be used as binders for the flux decompose and leave an undesirable residue.

The present invention is directed to hydrazine type fluxes which have all the advantages of the usual hydrazine fluxes and which are capable of being applied to the parts to be joined and held or bound thereto tenaciously in any desired position until the actual soldering temperature is reached whereupon the flux cleans the surface and then together with its carrier, or binder, substantially disappears and thereby permits a substantially uniform and perfect junction to be formed.

This condition is accomplished by utilizing an alcohol carrier for the hydrazine flux together with an alcohol soluble material which will sublime or disappear at a relatively low soldering temperature within substantially the same temperature range at which the flux decomposes and which will be substantially solid at room temperature and will hold the hydrazine flux in place. The material referred to in this instance is a polyamide such as is sold under the trade name of nylon. It is apparent that the specific polyamide used must be an alcohol soluble polyamide since the fluid carrier for the flux is preferably alcohol which will quickly evaporate to leave the flux in place on the portion to be soldered.

It is, therefore, the main object of the invention to provide a soldering flux of the hydrazine hydrohalide type which includes an alcohol soluble polyamide incorporated therewith that will maintain the flux in position prior to the soldering operation and which leaves no corrosive residue.

In carrying out this object, it is a further object to provide a composition of matter comprising an alcohol carrier, in which is incorporated at least one of the salts taken from the class consisting of hydrazine monohydrochloride, hydrazine dihydrochloride, hydrazine monohydrobromide and hydrazine dihydrobromide together with an alcohol soluble polyamide.

Another object of the invention is to provide a method for soldering wherein a fluid hydrazine hydrohalide flux is used which includes an alcohol carrier together with an alcohol soluble polyamide therein whereby the flux may be painted on the parts to be soldered, the alcohol evaporated to provide a continuous covering over the surface to be soldered which includes the hydrazine hydrohalide maintained tenaciously in place by the nylon and then to carry out the soldering operation for joining the parts and simultaneously to cause substantially complete loss of the hydrazine hydrohalide and the alcohol soluble polyamide whereby a strong continuous soldered joint is obtained.

Further objects and advantages of the present invention will be apparent from the description which follows.

Hydrazine fluxes are clearly disclosed in Patents 2,612,460 and 2,612,459 wherein a water solution of the hydrazine flux is set forth which may be used in soft soldering operations. This flux is applied to the surfaces to be joined and may have incorporated therewith waxes or petroleum jelly. It is apparent that the waxes and petroleum jelly upon decomposition will leave a substantial residue of amorphous carbon which will be present at the joined surfaces and will produce an imperfect joint as well as lowering both the strength and electrical conductivity of the joint.

The present invention is directed to a specific type of hydrazine flux which may be used without leaving a substantial residue of extraneous materials either corrosive or otherwise and which is particularly useful for soldering or lead burning, as disclosed in copending application, S.N. 677,652, now U.S. Patent No. 2,942,059, filed concurrently herewith wherein lead parts of storage batteries are cast and simultaneously burned to other precast parts through the use of the flux and wherein a high strength of joint is necessary together with good electrical conductivity.

The hydrazine component is carried by an alcohol solvent, for example, methyl ethyl or isopropyl alcohol or combinations thereof in aqueous solution. For the most part, we prefer to use either ethyl or isopropyl alcohol as the alcohol component wherein 75 to 90% alcohol is used with the remainder being water. To this solution is added, and dissolved, an alcohol soluble polyamide preferably in about equal quantities by weight to the hydrazine used although this may range from 1 to 2½ parts of the hydrazine component used by weight. The resulting flux is fluid and may be painted on the surfaces to be joined whereupon the alcohol evaporates leaving the hydrazine component residue intermixed with the polyamide which holds the hydrazine in place on the part to be soldered or burned. During the soldering or lead burning operation, the heat applied causes the temperature to rise to a point where the polyamide sublimes and the hydrazine decomposes to substantially disappear while simultaneously fluxing the surfaces whereby a highly desirable joint is produced without substantial extraneous materials being present at the interface.

Alcohol soluble polyamides are well known and differ from the usual types of polyamides in that they are modified so that the polyamide which is normally alcohol insoluble becomes alcohol soluble, all of these materials being sold under the generic name of nylon. A rather complete discourse on alcohol soluble polyamides may be found in Patents 2,441,057, 2,430,860 and 2,443,486 among others, it being understood that polyamides that are alcohol soluble are readily available and well known. The following examples directed to the preparation of alcohol soluble polyamides are illustrative.

EXAMPLE I

A mixture of 100 parts fiber-forming polyhexamethylene adipamide of 40 mesh screenings, 110 parts of paraformaldehyde, and 300 parts of pyridine were placed in a pressure bomb of such size that the tube was filled to half its capacity. The tube was sealed and heated during the course of about 30 minutes to a temperature of 130° C. under the pressure developed in the tube. The heating was then continued an additional 30 minutes at 130°–140° C. Throughout the heating period the tube was shaken. The reaction vessel was then cooled and opened, and the product, a clear, thin syrup, was diluted with ethanol and poured into water. This caused the N-methylol polyhexamethylene adipamide (N-methylol polyamide) to separate as a soft precipitate. The precipitate was redissolved in ethanol and reprecipitated in water. After being dried the resultant precipitate was found to have a methylol content of 13.8% which corresponds to 61% substitution of the original amide groups in the polyamide.

The product was a soft rubbery material which was very soluble in aqueous alcohols such as methyl, ethyl and isopropyl alcohols in aqueous solution containing not more than 40 parts of water per 100 parts of solution.

EXAMPLE II

A mixture of 100 parts of polyhexamethylene adipamide having an intrinsic viscosity of 1.0 of 40 mesh screenings, 100 parts paraformaldehyde, 300 parts chloroform, and 1 part of anhydrous sodium carbonate were mixed in a pressure bomb, which was sealed and heated to 130° C. and maintained between 130° and 135° for 30 minutes. The product of the reaction was a soft paste which readily dissolved in ethanol and was isolated in the manner of Example I. The methylol polyamide contained 10.5% formaldehyde present as methylol which corresponds to 44% substitution of the original amide groups. It exhibited properties similar to those described in Example I.

EXAMPLE III

One hundred parts of polyhexamethylene adipamide of 40 mesh screenings, 125 parts of paraformaldehyde, 300 parts pyridine, and 24 parts of water were reacted in a pressure vessel in the same manner as in Example I. The reaction product was isolated in the same manner. It was found to contain 10.3% methylol, which corresponds to 43% substitution of the original amide groups. The product was similar in properties to the N-methylol polyamide described in Example I.

EXAMPLE IV

A solution of 30 parts of a fiber-forming interpolymer derived from hexamethylenediammonium adipate (30 parts) and hexamethylenediammonium sebacate (70 parts), (intrinsic viscosity about 0.8) in 120 parts of formic acid (specific gravity=1.20) was prepared at 70°–80° C. To this solution was added a mixture of 20 parts paraformaldehyde and 112 parts methyl hydroxyacetate and the mixture heated at about 75° C. for 30 minutes. This solution was poured into aqueous sodium hydroxide and the N-carbomethoxymethoxymethyl polyamide separated as a white fibrous solid. This product was readily soluble in aqueous alcohol.

The present flux is especially desirable since there is no greasy or waxy residue left at the completion of the soldering operation. Furthermore, there is little or no residue of any type left which would tend to weaken the joint. The use of the alcohol soluble nylon as a carrier eliminates the necessity of washing or cleaning away greasy, waxy residues since the nylon component completely disappears during the soldering step.

Some specific examples of suitable fluxes are as follows wherein all proportions are expressed by weight.

*Example 1*

|   | Parts |
|---|---|
| Isopropyl alcohol (80% alcohol-20% water) | 8 |
| Hydrazine dihydrobromide | 1 |
| Alcohol soluble polyamide | 1 |

*Example 2*

|   |   |
|---|---|
| Alcohol (95% ethyl-5% methyl-90% solution in water) | 7 |
| Hydrazine dihydrobromide | 1 |
| Alcohol soluble polyamide | 2 |

*Example 3*

|   |   |
|---|---|
| Isopropyl alcohol (90% alcohol-10% water) | 6½ |
| Hydrazine dihydrochloride and hydrazine dihydrobromide (ratio 1 to 1) | 1 |
| Alcohol soluble polyamide | 2¼ |

*Example 4*

|   |   |
|---|---|
| Ethyl alcohol (90% alcohol-10% water) | 7½ |
| Hydrazine dihydrochloride | 1 |
| Alcohol soluble polyamide | 1½ |

*Example 5*

|   |   |
|---|---|
| Isopropyl alcohol (80% alcohol-20% water) | 8 |
| Hydrazine dihydrobromide and hydrazine dihydrochloride (ratio 6 to 4) | 1 |
| Alcohol soluble polyamide | 1 |

*Example 6*

|   |   |
|---|---|
| Alcohol (90% ethyl alcohol-10% water) | 6½ |
| Hydrazine component (hydrazine dihydrochloride and hydrazine monohydrochloride) (ratio 1 to 1) | 1 |
| Alcohol soluble polyamide | 2½ |

*Example 7*

|   |   |
|---|---|
| Isopropyl alcohol (80% alcohol-20% water) | 8 |
| Hydrazine dihydrobromide, hydrazine monohydrobromide (ratio 1 to 1) | 1 |
| Alcohol soluble polyamide | 1 |

*Example 8*

|   |   |
|---|---|
| Isopropyl alcohol (80% alcohol-20% water) | 8 |
| Hydrazine dihydrochloride, hydrazine monohydrobromide (ratio 1 to 1) | 1 |
| Alcohol soluble polyamide | 1 |

*Example 9*

|   |   |
|---|---|
| Isopropyl alcohol (80% alcohol-20% water) | 8 |
| Hydrazine dihydrobromide, hydrazine monohydrochloride (ratio 1 to 1) | 1 |
| Alcohol soluble polyamide | 1 |

These are but a few examples of specific fluxes which may be used in soldering or lead burning operations and it is apparent that a wide range of mixtures and proportions may be used. These fluxes are suitable in soft soldering operations involving all types of metals such as lead, iron or steel, brass, bronze, etc.

In general, the weight of polyamide used is from one to two and one-half times the weight of hydrazine component used. The alcohol in all cases must be sufficient in strength and quantity to dissolve these ingredients.

In some cases where a mildly corrosive residue is not objectionable, it is possible to add additional fluxing compounds to the hydrazine component. Ammonium chloride and ammonium bromide are two suitable materials. In all instances, where these additives are made, the fluxing component should be fully soluble in the alcohol solvent used and, therefore, additions of these two ammonium halides should be fully within their solubility limits for the specific alcohol vehicle contemplated. In each instance the addition may be made up to about 20% of the hydrazine component providing the solubility limitations are realized. The following examples are exemplary.

*Example 1*

|   | Parts |
|---|---|
| Alcohol (95% ethyl-5% methyl-90% solution in water) | 7 |
| Hydrazine component (hydrazine dihydrobromide-90%-ammonium chloride 10%) | 1 |
| Alcohol soluble polyamide | 2 |

Example 2

| | |
|---|---|
| Alcohol (90% ethyl-10% methyl-90% solution in water) | 7 |
| Hydrazine component (hydrazine dihydrochloride 90%-hydrazine monohydrobromide 5%-ammonium chloride 5%) | 1 |
| Alcohol soluble polyamide | 2 |

Example 3

| | |
|---|---|
| Alcohol (95% ethyl-5% methyl-90% solution in water) | 7 |
| Hydrazine component (hydrazine dihydrobromide 98%-ammonium bromide 2%) | 1 |
| Alcohol soluble polyamide | 2 |

A related application, assigned to the assignee of the present invention, is being filed concurrently herewith. This application bears the serial number 677,803, now U.S. Patent No. 2,980,562.

While the embodiments of the present invention as herein disclosed constitute preferred forms, it is to be understood that other forms might be adopted.

What is claimed is as follows:

1. A composition of matter suitable for use as a soldering flux consisting essentially of, a component consisting of a carrier containing a hydrazine hydrohalide selected from the group consisting of hydrazine dihydrochloride and hydrazine dihydrobromide together with at least equal quantities by weight of a high melting point material consisting of an alcohol soluble nylon-type polyamide in quantities of from about 1 to 2½ times by weight of the hydrazine hydrohalide used and alcohol as a solvent.

2. The composition matter claimed in claim 1 wherein the salt is hydrazine dihydrobromide.

3. The composition matter claimed in claim 1 wherein the salt is hydrazine dihydrochloride.

4. The composition matter claimed in claim 1 wherein the carrier is a water solution of a monohydric alcohol containing not more than three carbon atoms.

5. A composition of matter suitable for use as a soldering flux, consisting essentially of at least one salt taken from the class consisting of hydrazine dihydrobromide and hydrazine dihydrochloride, a high melting point material consisting of an alcohol soluble nylon-type polyamide in quantities of from about 1 to 2½ times by weight of the quantity of the salt used together with an aqueous solution of a monohydric alcohol solvent containing not more than three carbon atoms.

6. The flux claimed in claim 5 wherein the salt is hydrazine dihydrobromide.

7. The flux claimed in claim 5 wherein the salt is hydrazine dihydrochloride.

8. A composition of matter suitable for use as a soldering flux consisting essentially of hydrazine dihydrobromide 1 part, and a high melting point material consisting of an alcohol soluble nylon-type polyamide 1 to 2½ parts, said ingredients being carried in an aqueous solution of isopropyl alcohol.

9. A composition of matter suitable for use as a soldering flux consisting essentially of hydrazine dihydrobromide 1 part and an alcohol soluble nylon-type polyamide 1 to 2½ parts, said ingredients being carried in a solution comprising ethyl alcohol in water.

10. The composition claimed in claim 1 wherein a salt taken from the class consisting of ammonium chloride and ammonium bromide is added to the hydrazine hydrohalide in quantities up to about 10% by weight of the hydrohalide used.

11. A composition of matter suitable for use as a soldering flux consisting essentially of hydrazine dihydrobromide 1 part, a high melting point material consisting of an alcohol soluble nylon-type polyamide 1 to 2½ parts with the remainder comprising an aqueous solution of one or more of the alcohols in the group consisting of monohydric alcohols having one to three carbon atoms.

12. In a method of joining metal parts to another by means of a soft soldered joint, the steps of; applying the flowable flux composition defined in claim 1 to the surface of at least one metal, evaporating the alcohol therefrom for maintaining the hydrazine salt in position on the part to which it is applied by means of the solidified polyamide, holding the part in tight relation to the other part to be joined thereto, heating the two parts to a temperature sufficient to decompose the flux, substantially simultaneously applying molten solder to the joint whereby the solder wets and adheres to the fluxed surface and, upon cooling, permanently forms a clean and continuous joint.

13. In a method for soft soldering two metal parts together at juxtaposed surfaces, the steps of; applying to the surface of at least one of the parts the flowable flux composition defined in claim 1, evaporating the alcohol therefrom for maintaining the hydrazine hydrohalide in position on the part to which it is applied by means of the solidified polyamide binder, providing soft solder at the junction, heating the parts and the solder above the melting point of the solder for causing the solder to melt and to flow over the flux surface and simultaneously decompose the flux composition from between the metals to be joined whereby a clean soldered junction is provided upon cooling of the parts.

References Cited in the file of this patent

UNITED STATES PATENTS

| | | |
|---|---|---|
| 2,612,459 | Willard et al. | Sep. 30, 1952 |
| 2,756,497 | Gale | July 31, 1956 |
| 2,801,196 | Doerr | July 30, 1957 |
| 2,980,562 | Matters et al. | Apr. 18, 1961 |

FOREIGN PATENTS

| | | |
|---|---|---|
| 745,405 | Great Britain | Feb. 22, 1956 |